United States Patent [19]
Brown

[11] Patent Number: 5,280,661
[45] Date of Patent: Jan. 25, 1994

[54] DIGITAL WIPE DEVICE FOR LENSES AND SIMILAR ARTICLES

[76] Inventor: Charles E. Brown, P.O. Box 335, Keyport, Wash. 98345-0335

[21] Appl. No.: 970,106

[22] Filed: Nov. 2, 1992

[51] Int. Cl.$^5$ .............................................. A47L 25/00
[52] U.S. Cl. ...................................... 15/214; 15/223; 15/227
[58] Field of Search ..................... 15/118, 214, 220.3, 15/223, 227

[56] References Cited

U.S. PATENT DOCUMENTS

| | | | |
|---|---|---|---|
| 722,863 | 3/1903 | Lodge | 15/227 |
| 1,464,529 | 8/1923 | Holcomb | 15/227 |
| 1,643,722 | 9/1927 | Millen | 15/227 |
| 1,756,408 | 4/1930 | Walker et al. | 15/227 |
| 2,590,977 | 4/1952 | Kay | 15/227 |
| 2,821,731 | 2/1958 | May | 15/227 |
| 3,056,154 | 10/1962 | Neal | 15/227 |

FOREIGN PATENT DOCUMENTS

| | | | |
|---|---|---|---|
| 2446618 | 9/1980 | France | 15/227 |
| 5567 | of 1904 | United Kingdom | 15/214 |

Primary Examiner—Stephen F. Gerrity
Assistant Examiner—Mark Spisich
Attorney, Agent, or Firm—Richard L. Miller

[57] ABSTRACT

A digital wipe device is provided for lenses and similar articles which consists of a pair of sheaths in which the first sheath fits on a thumb of a hand and the second sheath fits on a finger of the hand. An interconnecting flexible member is connected to and extends between one side of each of the sheaths. A plurality of wiping sheets are connected in a stacked manner to an underside of the interconnecting flexible member and the sheaths, so that the outermost wiping sheet can be used to clean the lenses and similar articles between the thumb and finger and than torn away when soiled to expose a fresh clean wiping sheet for further use.

6 Claims, 1 Drawing Sheet

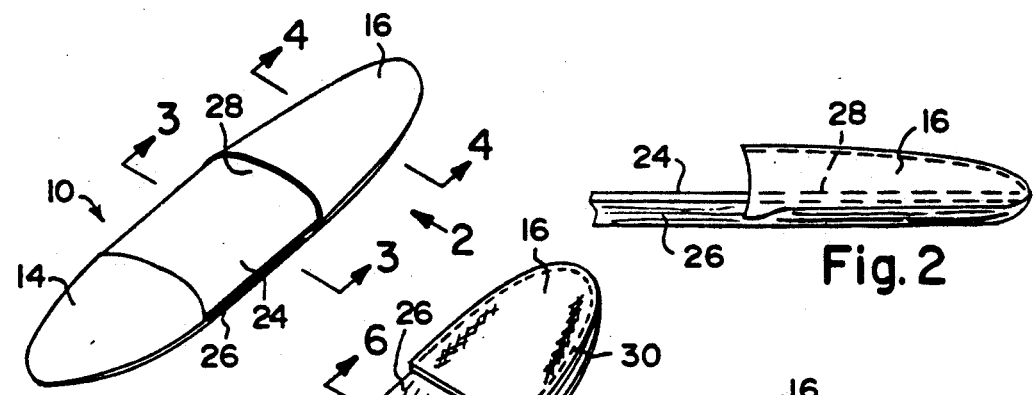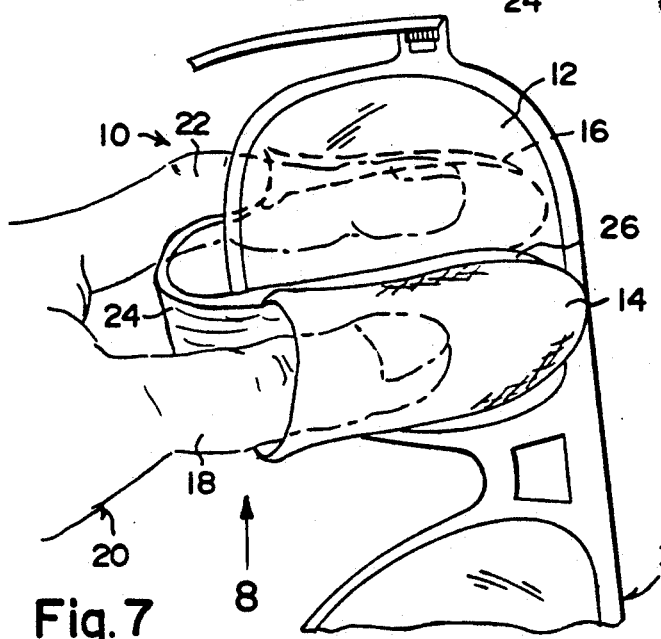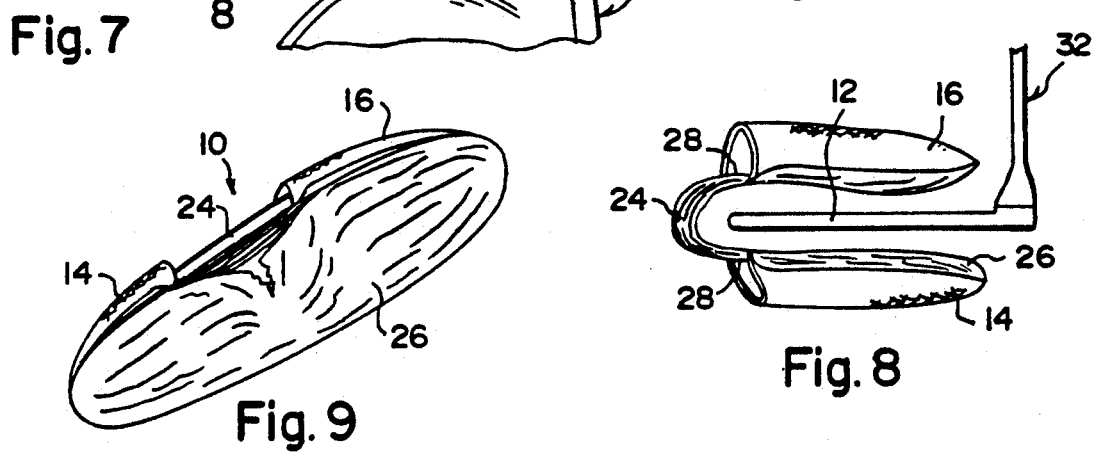

DIGITAL WIPE DEVICE FOR LENSES AND SIMILAR ARTICLES

BACKGROUND OF THE INVENTION

The instant invention is the subject matter of Disclosure Document No.: 295118, filed in the PTO on Nov. 14, 1991, and it is respectfully requested that this document be retained beyond the two-year period so that it may be relied upon as evidence of conception of the invention during the prosecution phase of this application, should the need arise.

The instant invention relates generally to finger engagement apparatuses and more specifically it relates to a digital wipe device for lenses and similar articles.

Numerous finger engagement apparatuses have been provided in the prior art that are adapted to perform various tasks when the apparatuses are engaged by the fingers. For example, U.S. Pat. Nos. numbered Des. 251,539 to Kupperman et al.; 4,796,302 to David et al. and 4,938,515 to Fazio all are illustrative of such prior art. While these units may be suitable for the particular purpose to which they address, the would not be as suitable for the purpose of the present invention as hereafter described.

SUMMARY OF THE INVENTION

A primary object of the present invention is to provide a digital wipe device for lenses and similar articles that will overcome the shortcomings of the prior art devices.

Another object is to provide a digital wipe device for lenses and similar articles that includes two sheaths with an interconnecting flexible member, which fit onto a thumb and finger of a hand, while the underside of the interconnecting flexible member contains wiping sheets to clean.

An additional object is to provide a digital wipe device for lenses and similar articles in which the wiping sheets are attached to the underside of the interconnecting flexible member in a stacked relationship, so that after use the outermost wiping sheet can be torn away to expose an unused clean wiping sheet in nested in the stack for future use.

A further object is to provide a digital wipe device for lenses and similar articles that is simple and easy to use.

A still further object is to provide a digital wipe device for lenses and similar articles that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention;

FIG. 2 is a diagrammatic elevational view with parts broken away taken in the direction of arrow 2 in FIG. 1 thereof;

FIG. 3 is a cross sectional view taken on line 3—3 in FIG. 1;

FIG. 4 is a cross sectional view taken on line 4—4 in FIG. 1;

FIG. 5 is a diagrammatic perspective view with parts broken away of the instant invention, showing the fabrication thereof before the digit sheath has been turned inside out;

FIG. 6 is a cross sectional view taken on line 6—6 in FIG. 5;

FIG. 7 is a diagrammatic perspective view illustrating the instant invention being used to clean a typical pair of eye glasses;

FIG. 8 is a diagrammatic view taken in the direction of arrow 8 in FIG. 7 with the hand omitted; and FIG. 9 is another diagrammatic perspective view of the instant invention illustrating how the wiping sheets may be singly torn therefrom.

DETAILED DESCRIPTION OF THE PREFERRED EMBODIMENTS

Turning now descriptively to the drawings, in which similar reference characters denote similar elements throughout the several views, the Figures illustrate a digital wipe device 10 for lenses and similar articles 12, which consists of a pair of sheaths 14, 16 in which the first sheath 14 fits on a thumb 18 of a hand 20 and the second sheath 16 fits on a finger 22 of the hand 20. An interconnecting flexible member 24 is connected to and extends between one side of the sheaths 14, 16. A plurality of wiping sheets 26 are connected to the underside of the interconnecting flexible member 24 and the sheaths 14, 16, so that the outermost wiping sheet 26 can clean the lenses and similar articles 12 between the thumb 18 and the finger 22.

The interconnecting flexible member 24 is fabricated out of the similar material as the pair of sheaths 14, 16 and is integral with the one side 28 of the sheaths 14, 16. The material for the sheaths 14, 16 and the interconnecting flexible member 24 can be typically but not limited to cloth, plastic, leather, other synthetic fabric and the like. The sheaths 14, 16 the interconnecting flexible member 24 and the wiping sheets 26 are all connected together by stitching 30.

To use the digital wipe device 10 a person slips their thumb 18 into the first sheath 14 and their finger 22 in the second sheath 16 and then bends the interconnecting flexible member 24. The outermost wiping sheet 26 can then be placed on both sides of one lens 12, such as in a pair of glasses 32, shown in FIGS. 7 and 8 to clean the lens 12. When the outermost wiping sheet 26 needs to be replaced it can be torn away, as shown in FIG. 9, so that the next outermost wiping sheet 26 can now be exposed to be used.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A digital wipe device suitable for lenses of eyeglasses which comprises:

a) a pair of sheaths each sized to hold a single finger or thumb of a hand;
b) an interconnecting elongated flexible sheet member having first and second sides and opposed ends, said pair of sheaths each respectively attached to the first side of the interconnecting member at one of said ends, each of said sheaths further comprising pockets which have respective open ends facing each other upon the interconnecting member assuming a flat configuration; and
c) a stack of wiping sheets superposed in face-to-face relationship and connected to the second side of said interconnecting flexible member so that an outermost wiping sheet can be used to clean a lens placed between the thumb and finger which have been inserted in said pair of sheaths and that soiled wiping sheets may be selectively removed to expose a new wiping sheet.

2. A digital wipe device as recited in claim 1, wherein said interconnecting flexible member is fabricated out of a similar material as said pair of sheaths and is integral with said pair of sheaths.

3. A digital wipe device as recited in claim 2, wherein said sheaths, said interconnecting flexible member and said wiping sheets are all connected together by stitching.

4. A digital wipe device as recited in claim 3, wherein said material for said sheaths and said interconnecting flexible member is fabricated out of cloth.

5. A digital wipe device as recited in claim 3, wherein said material for said sheaths and said interconnecting flexible member is fabricated out of synethetic.

6. A digital wipe device as recited in claim 3, wherein said material for said sheaths and said interconnecting flexible member is fabricated out of leather.

* * * * *